(12) United States Patent
Mannheimer et al.

(10) Patent No.: US 7,752,546 B2
(45) Date of Patent: Jul. 6, 2010

(54) METHOD AND SYSTEM FOR PROVIDING AN ACOUSTIC INTERFACE

(75) Inventors: Steve Mannheimer, Carmel, IN (US);
Barry Jay Weber, Carmel, IN (US);
Kerry Wayne Calvert, Indianapolis, IN (US); Jonathan Paul Griffin, Greenfield, IN (US)

(73) Assignee: Thomson Licensing, Boulogne, Billancourt (FR)

( * ) Notice: Subject to any disclaimer, the term of this patent is extended or adjusted under 35 U.S.C. 154(b) by 1215 days.

(21) Appl. No.: 09/896,966

(22) Filed: Jun. 29, 2001

(65) Prior Publication Data

US 2003/0001881 A1    Jan. 2, 2003

(51) Int. Cl.
*G06F 3/00* (2006.01)
(52) U.S. Cl. .................. 715/716; 715/727; 715/729; 715/810; 715/853
(58) Field of Classification Search .......... 345/716, 345/727, 729, 810, 853, 978; 434/308, 309, 434/315, 316, 318, 319, 321; 715/716, 727, 715/729, 978, 810, 853
See application file for complete search history.

(56) References Cited

U.S. PATENT DOCUMENTS

| 5,287,102 | A | 2/1994 | McKiel, Jr. ............ 340/825.19 |
| 5,510,811 | A | 4/1996 | Tobey et al. ................ 345/157 |
| 5,682,196 | A | 10/1997 | Freeman ..................... 348/13 |
| 5,799,267 | A | 8/1998 | Siegel ........................... 704/1 |

(Continued)

FOREIGN PATENT DOCUMENTS

JP    0-4291316    10/1992

(Continued)

OTHER PUBLICATIONS

Correspondence from Thomson Enginerring Labs, Lld. Tokyo, Japan dtd Aug. 21, 2008.

(Continued)

*Primary Examiner*—Tadesse Hailu
*Assistant Examiner*—Michael Roswell
(74) *Attorney, Agent, or Firm*—Robert D. Shedd; Vincent E. Duffy; Michael A. Pugel

(57) ABSTRACT

The present invention is directed towards a system and process for navigating through a large amount of information (e.g., audio files, text files, video files, device functions, etc.) using audio cues representative of the information. The audio cues are arranged in a multi-level tree data structure such that the user can select general categories (e.g., music classification) and navigate down to a specific data segment (e.g., a particular song or song list). Each audio cue is a brief burst of sound (e.g., a lyric from a particular song) representative of a predetermined number of additional audio cues or a particular data segment. The audio cues are selectable by a user and permit the user to navigate through the information or data segments without having to remember visual or alphanumeric elements (e.g., song title, artist name, or track number). The audio cues are stored in a storage device that can be accessed using a wireless device (e.g., a remote control or wireless mouse) or a wired device (e.g., keyboard, trackball, or touch pad). By manipulating the wireless or wired device, the user can navigate through the multi-level tree data structure of audio cues (generated by speakers) until a desired data segment is found.

18 Claims, 8 Drawing Sheets

U.S. PATENT DOCUMENTS

| | | | | |
|---|---|---|---|---|
| 5,835,156 | A | 11/1998 | Blonstein et al. | 348/569 |
| 5,959,627 | A | 9/1999 | Duwaer et al. | 345/345 |
| 5,991,781 | A | 11/1999 | Nielsen | 707/513 |
| 6,083,163 | A | 7/2000 | Wegner et al. | 600/429 |
| 6,111,562 | A | 8/2000 | Downs et al. | 345/145 |
| 6,163,510 | A | 12/2000 | Lee et al. | 369/32 |
| 6,184,876 | B1 | 2/2001 | Miller | 345/302 |
| 6,539,395 | B1 * | 3/2003 | Gjerdingen et al. | 707/102 |
| 6,983,251 | B1 | 1/2006 | Umemoto et al. | |
| 2002/0130901 | A1 | 9/2002 | Milovanovic | 345/744 |

FOREIGN PATENT DOCUMENTS

| | | |
|---|---|---|
| JP | 0-6138892 | 5/1994 |
| JP | 1-1303745 | 2/1999 |

OTHER PUBLICATIONS

Correspondence from Central International Law Firm. Seoul KR did Oct. 13, 2008.

Azusa Uemoto, et al., "Push-based Auditory User Interface", "Multimedia, Variation, Coordination, and Mobile Symposium (DICOMO' 99)" Jun. 1999 Information Processing Society of Japan. vol. 99, No. 7, pp. 189-194 System Development Center, Multimedia Development Headquarters, Sharp Corp.

* cited by examiner

METHOD AND SYSTEM FOR PROVIDING AN ACOUSTIC INTERFACE

FIELD OF THE INVENTION

The present invention relates to user interfaces for information systems. More particularly, the invention relates to the use of an acoustic interface to assist in navigation and manipulation of data segments.

BACKGROUND OF THE INVENTION

A graphical user interface is often used to facilitate a user's ability to navigate through large amounts of data. For example, if a user has downloaded a large number of MP3 audio files onto a hard drive of a personal computer, it may be cumbersome for the user to find a desired file by searching through a displayed list of stored MP3 audio files. To facilitate the search process the user may use a graphical user interface that enables the user to store the audio files in various user-defined folders. Thus the user may store related audio files in predetermined folders in a predetermined order. For example, the user may identify all of the audio files that relate to country music and store the country music audio files in a "Country Music" folder. Furthermore, the user may generate sub-folders within the "Country Music" folder that further sort the country music by artist, album title, and/or song name. Afterwards, the user can quickly sort through a large amount of MP3 audio files to locate a particular audio file associated with a music genre, artist, album, and/or song. Although graphical user interfaces facilitate a user's ability to locate desired audio files, the graphical user interfaces suffer form a number of drawbacks.

One such drawback is that graphical user interfaces relies on a user's ability to remember a visual or alphanumeric element associated with an audio file. In the case of music, a user typically must remember the genre, artist, album, and/or title of a desired vocal or instrumental. However, the user may only remember a few words of a song or a few notes of a tune. If this is the case, the user must guess as to which visual element represents the desired song until the desired song is located.

Another drawback is that the user may be in an environment where a graphical user interface is not provided or, even if provided, is not convenient to use. For example, many automobiles come equipped with a multi-CD storage device that enables a driver to play a plurality of compact disks. Sometimes these multi-CD storage devices have primitive graphical user interfaces that only display the number of compact disks in the storage device and the number of tracks on a given compact disk. As a result, if the driver has not memorized the numerical identification of each compact disk in the storage device and the track number of every song on every compact disk, the driver must blindly search through the tracks of the compact disks until the desired audio content is located. If a more advanced graphical user interface is provided, the driver must still remember a visual element (e.g., album, artist, and/or title) associated with a desired song. Moreover, even if the driver has memorized which visual element is associated with a desired song, the driver may not be able to safely remove his or her focus from the surrounding driving conditions to locate the visual element displayed on the graphical user interface.

The present invention is directed to overcoming these drawbacks.

SUMMARY OF THE INVENTION

Briefly stated, the present invention is directed towards a system and process for allowing a user to navigate through a large amount of information (e.g., audio files, text files, video files, device functions, etc.) using audio cues representative of the information when the user is in an environment where a graphical user interface is not provided. The audio cues are arranged in a multi-level tree data structure such that the user can select general categories (e.g., music classification) and navigate down to a specific data segment (e.g., a particular song or song list). Each audio cue is a brief burst of sound (e.g., a lyric from a particular song) representative of a predetermined number of additional audio cues or a particular data segment. The audio cues are selectable by a user and permit the user to navigate through the information or data segments without having to remember visual or alphanumeric elements (e.g., song title, artist name, or track number). The audio cues are stored in a storage device that can be accessed using a wireless device (e.g., a remote control or wireless mouse) or a wired device (e.g., keyboard, trackball, or touch pad). By manipulating the wireless or wired device, the user can navigate through the multi-level tree data structure of audio cues (generated by speakers) until a desired data segment is found.

A feature of the present invention includes a method of providing access to a plurality of data segments. The method includes storing a plurality of audio cues in a memory, each audio cue representing a predetermined number of stored audio cues or a data segment, providing access to a first predetermined number of stored audio cues, playing one of the first predetermined number of stored audio cues in response to a first user request, and retrieving one of a data segment or a second predetermined number of stored audio cues in response to a second user request.

Another feature of the present invention includes a user interface system. The user interface system includes a data segment interface communicatively connected to a source of data segments, a computer readable medium interface communicatively connected to a computer readable medium having a plurality of audio cues stored thereon, each audio cue being associated with a data segment, a device for transmitting a request in response to a user input, an audio interface communicatively connected to an audio system, and a processor for retrieving an audio cue from the computer readable medium and playing the retrieved audio cue on the audio system in response to a received request.

A further feature of the present invention includes a multi-level data tree structure of audio cues stored in a computer readable medium. Each level containing a predetermined number of audio cues. Each audio cue of a given level being linked to another level in the multi-level data tree structure or to a data segment.

DETAILED DESCRIPTION OF THE PREFERRED EMBODIMENT

The characteristics and advantages of the present invention will become more apparent from the following description, given by way of example.

Figure 1:
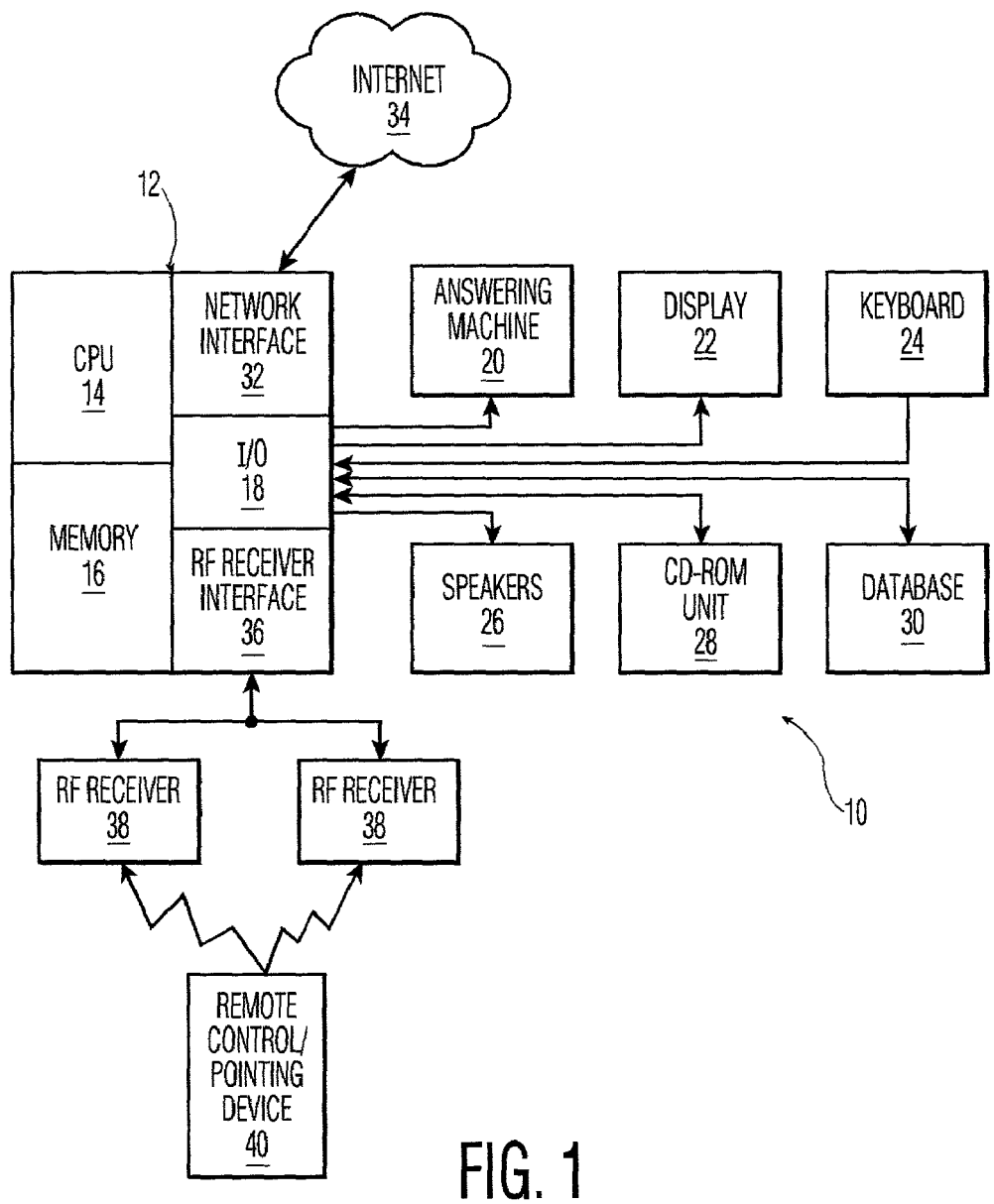
FIG. 1 is a block diagram of an exemplary computer system configured to support the acoustic interface of the present invention.

Referring to FIG. 1, some of the elements of a computer system 10 configured to support the invention are shown. Computer system 10 includes a processor 12 having a central processing unit ("CPU") 14, a memory section 16, and an Input/Output ("I/O") section 18. Memory section 16 may be volatile or non-volatile and may include a removable flash card memory. The I/O section 18 is connected to an answering machine 20, a display unit 22, a keyboard 24, a speaker system 26, a compact disk ("CD") unit 28 that can read data from a CD-ROM medium and preferably includes a CD storage unit for storage of a plurality of CDs, and a database 30 for storing files such as audio files read from a CD or downloaded from the internet. Processor 12 has a network interface 32 that enables computer system 12 to communicate over the internet 34 such that computer system 12 can retrieve audio files in a plurality of formats (e.g., MP3, MIDI, etc.) from remote databases. Network interface 32 also enables computer system 12 to receive audio content from internet radio sources. Processor 12 includes an RF receiver interface 36 that enables computer system 10 to receive signals from a remote control and/or pointing device 40 via a pair of RF receivers 38 in accordance with the present invention, as discussed in further detail below.

One skilled in the art will understand that the invention described herein does not depend on the existence of all of the units of computer system 10 and may include additional sources of audio data. For example, the invention does not require a network interface connecting the computer system 10 to the internet since the audio data to be played to a user often resides in the memory of the computer accessing the information. Furthermore, one skilled in the art will understand that processor 12 may reside in one of a plurality of electronic devices such as a desk-top computer, a lap-top computer, a stereo system, a home entertainment center, an automobile music system, or a household device. As such, the acoustic interface of the present invention is not restricted to facilitating a user's navigation through audio data segments. The acoustic interface may also facilitate the user's manipulation of other data segments such as text and video files as well as the user's ability to remotely control various electronic devices.

Figure 2:
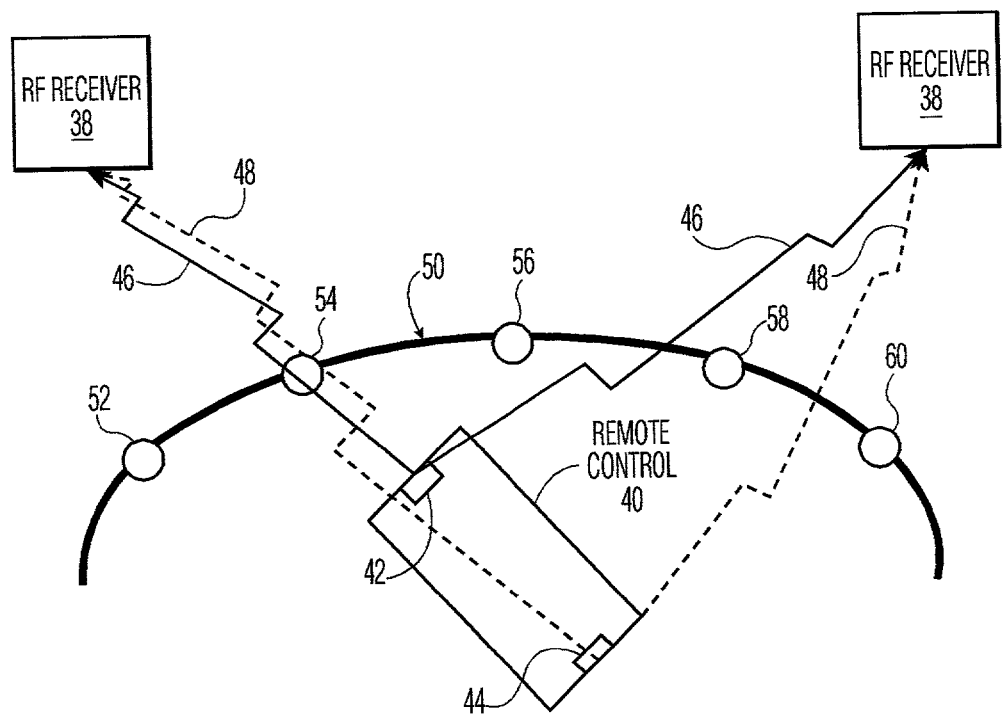
FIG. 2 is a block diagram illustrating the movement of a remote control of the system of FIG. 1 along a virtual arc of the acoustic interface of the present invention.

Referring now to FIG. 2, the communication between pointing device 40 and RF receivers 38 as pointing device 40 travels along an acoustic interface virtual arc 50 is shown. As shown in FIG. 2, pointing device 40 includes a pair of RF transmitters 42 and 44 on either end thereof. As pointing device 40 is moved along virtual arc 50 transmitters 42 and 44 generate RF signals 46 and 48, respectively. RF receivers 38 receive these signals and, together with RF receiver interface 36 and CPU 14 (shown in FIG. 1), process the signals to determine the position of pointing device 40 along virtual arc 50, as known by those skilled in the art. Alternatively, pointing device 40 may include four RF sensors that detect a single-source signal (i.e., a signal transmitted from a transmitter of computer system 10) and a CPU that process the input from the sensors to determine the positioning of pointing device 40 along virtual arc 50. The positioning data may then be transmitted back to computer system 10 such that computer system 10 can track the positioning of pointing device 40 along virtual arc 50. Although pointing device 40 is illustrated as the preferred remote control, use of a conventional remote control having directional arrows, a track ball, or the like, is considered within the scope of the present invention. It should be noted that if a conventional remote control is used, the user would merely manipulate the directional buttons or track ball in a horizontal or vertical manner to navigate along a virtual configuration such as a virtual grid or matrix. It should also be noted that the use of wired controls (e.g., control pads, touch pads, joysticks, trackballs and the like) are considered within the scope of the present invention.

Pointing device 40 preferably includes a plurality of functional buttons, toggles, thumb wheels and the like. Some exemplary buttons are a "select" button permitting the user to select a given virtual arc point 52-60 on virtual arc 50, "navigation" buttons allowing a user to go up or down through the audio cue levels in an audio cue tree (shown in FIGS. 3 and 4), a thumbed wheel to adjust volume, a "pause" button, a "fast-forward" button, a "rewind" button, a "skip" button, and a "power" button. The use of other buttons for additional conventional audio controls is considered within the scope of the present invention.

Virtual arc 50 includes a plurality of points 52-60 corresponding to audio cues stored in a memory of computer system 10. The audio cues are arranged in a multi-level tree data structure such that the user can select general categories (e.g., music classification) and navigate down to a specific segment of audio information (e.g., a particular song or song list), as discussed in further detail below. Virtual arc 50 roughly corresponds to the natural sweep of the user's arm moving as if shining a flashlight in an arc of roughly 90-120 degrees centered on a virtual point 56 directly in front of the user. When processor 12 determines that pointing device 40 is in the vicinity of one of the points 52-56 of virtual arc 50, processor 12 retrieves an audio cue stored in a storage device (e.g., memory 16, database 30, or a remote database accessed over Internet 34) and processes the audio cue such that speakers 26 generate the audio cue. The audio cue is preferably a brief (2-5 seconds) burst of sound representative of the audio content assigned to a given point 52-56 on virtual arc 50. The audio cues may be selected by a user or provided by the supplier of the audio content, as discussed in further detail below. One exemplary audio cue is a snippet of a favorite music (e.g., the four opening notes of Beethoven's $5^{th}$ Symphony) to serve as the identifier for a music category (e.g., classical music), song (Beethoven's $5^{th}$ Symphony), song list (a compilation of Beethoven's symphonies), or artist (Beethoven). Another exemplary audio cue may be a computer-generated voice indicating music category, song, or artist. A further exemplary audio cue may be a stored version of the user's own voice describing a music category, song, or artist.

Processor 12 may raise or lower the sound of an audio snippet being generated by speakers 26 as pointing device 40 approaches or departs from a given point 52-60 on virtual arc 50. Processor 12 also preferably provides audio feedback (e.g., an electronic beep or tone) via speakers 26 when a user selects a given point 52-60 on virtual arc 50.

Figure 3:
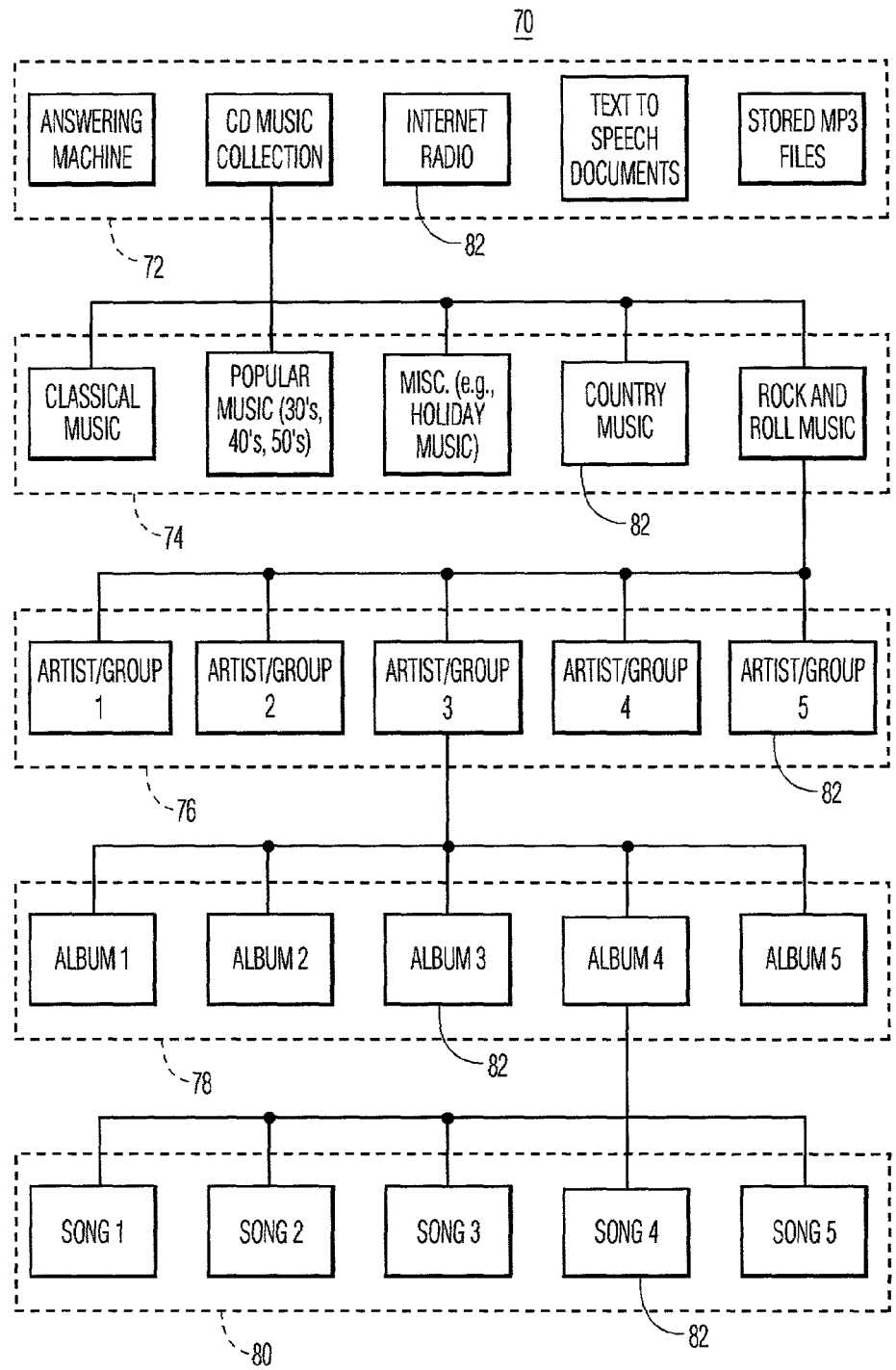
FIG. 3 is an exemplary multi-level tree data structure for the audio cues of the acoustic interface of the present invention.

Referring now to FIG. 3, an exemplary multi-level tree data structure 70 of audio cues 82 is shown. The multi-level tree data structure 70 is created by a user using conventional data management software and is stored in a storage device (e.g., memory 16, database 30, or a remote database accessed over Internet 34), as discussed above. Audio cues 82 are arranged in levels 72-80 of multi-level tree data structure 70 such that the user can select general categories and navigate down to a specific segment of audio information. For example, in FIG. 3, level 72 contains user-selected audio cues 82 that are representative of the source (e.g., the user's CD music collection) of the desired audio information. Level 74 contains user-selected audio cues 82 representative of different styles of music (e.g., Rock and Roll music). Level 76 contains user-selected audio cues 82 that are representative of specific artists or groups (e.g., artist/group 3). Level 78 contains user-selected audio cues 82 representative of specific albums (e.g., Album 3). Level 78 contains user-selected audio cues 82 representative of a specific song (e.g., song 4). It should be noted that the number of audio cues 82 per level 72-80 should correspond to the number of points 52-60 on virtual arc 50 (shown in FIG. 2). It should also be noted that each level may contain a different number of audio cues and that the number of points on the virtual arc may dynamically change to reflect the number of audio cues in a given level.

Figure 4:
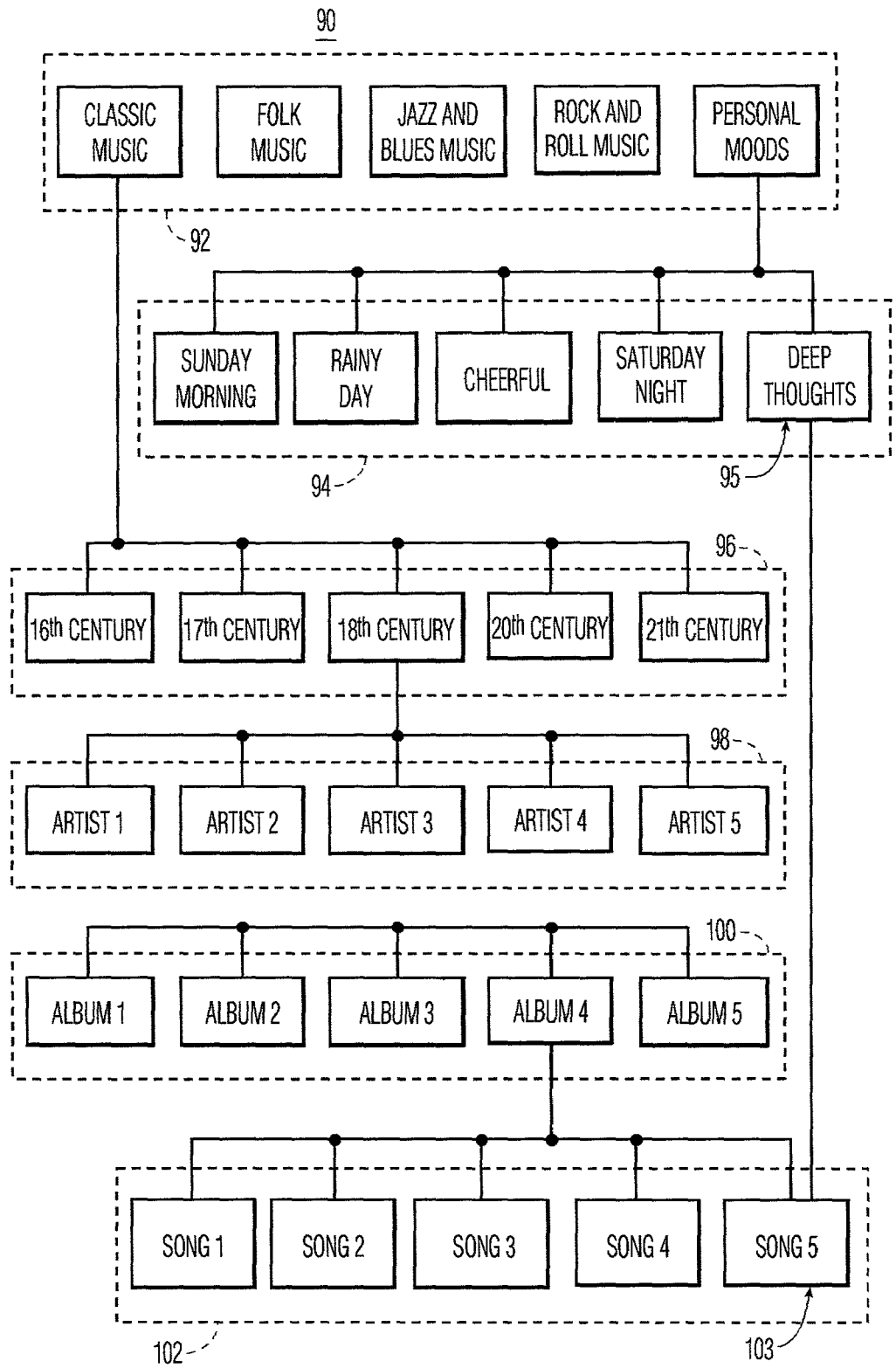
FIG. 4 is another exemplary multi-level tree data structure for the audio cues of the acoustic interface of the present invention.

Referring now to FIG. 4, another exemplary multi-level tree data structure 90 of audio cues 96 is shown. Multi-level tree data structure 90 illustrates that a user can link an audio cue 103 of one level 102 to audio cues 95 and 101 of other levels 94 and 100. This permits a user to navigate to a desired segment of audio information using different pathways in the multi-level tree data structure 90. More specifically, a user can access and play "song 5" though the "classical music" pathway or the "personal moods" pathway, as shown.

Figure 5:
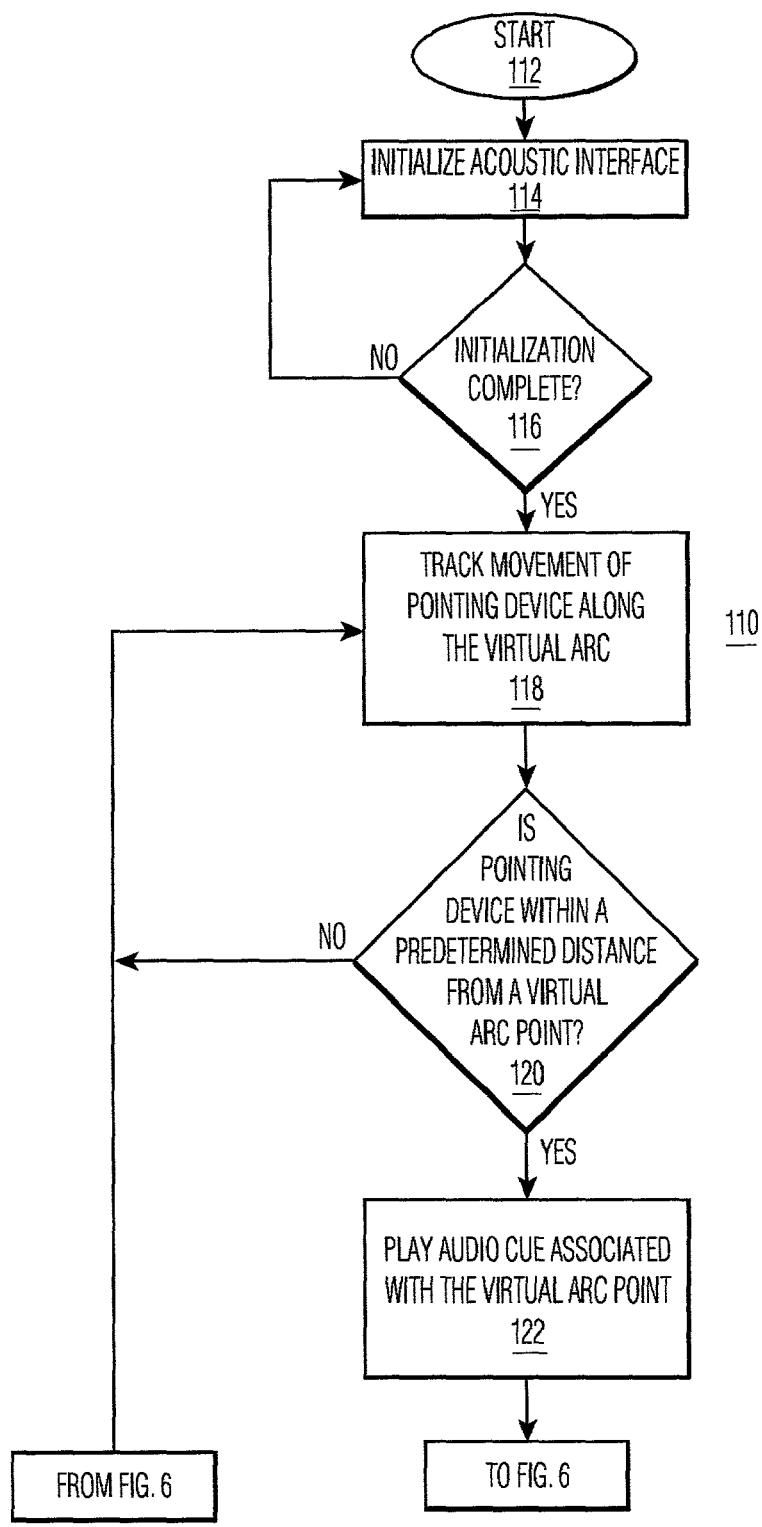
FIGS. 5 and 6 are flowcharts illustrating a process of navigating through audio information using the acoustical interface of the present invention.
Figure 6:
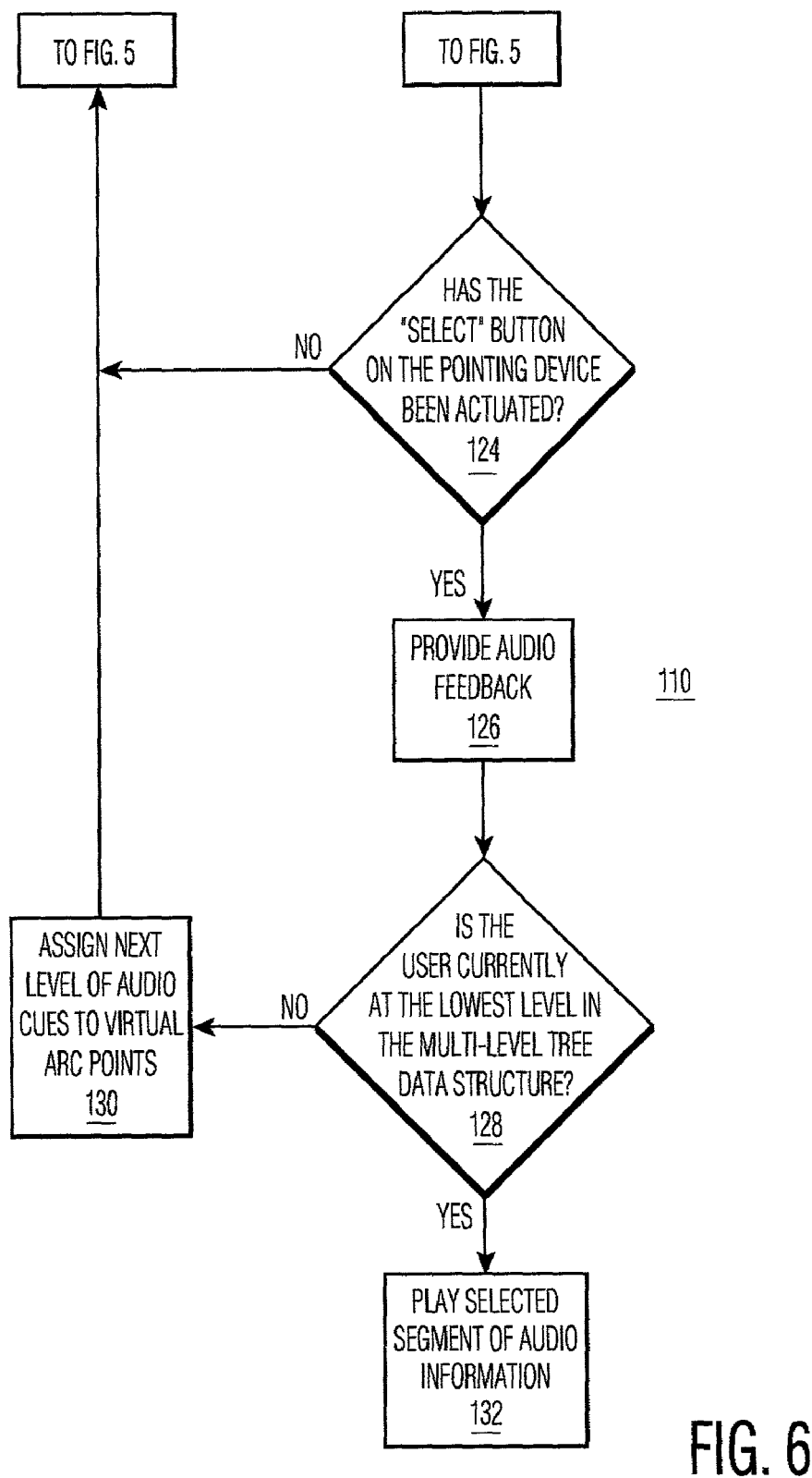

Referring now to FIGS. 5 and 6, a process 110 of navigating through audio information using the acoustic interface of the present invention is shown. Initially, at step 112, the user turns system 10 on by actuating the power button on pointing device 40. Afterwards the user, at step 114, initializes the acoustic interface by double clicking the "select" button on pointing device 40. In response, pointing device 40 transmits an initializing signal to processor 12 via RF receivers 38 and RF receiver interface 36. Processor 12, in turn, assigns the current position of pointing device 40 as the center point 56 of virtual arc 50 and maps the highest level of audio cues in the multi-level tree data structure (e.g., level 72 of FIG. 3) to points 52-60 of virtual arc 50. Processor 12 may also check the availability of audio data segment sources (e.g., Internet 34, CD-ROM unit 28, database 30 and/or memory 16). Next, at step 116, processor 12 determines if the initialization has been completed. If not, processor 12 returns to step 114 and continues the initialization process. If so, processor 12, at step 118, begins tracking the movement of pointing device 40 along virtual arc 50 as discussed in greater detail above.

Next, at step 120, processor 12 determines if pointing device 40 is within a predetermined distance from a virtual arc point 52-60. If not, processor 12 returns to step 118 and continues to track the movement of pointing device 40 along virtual arc 50. If so, processor 12, at step 122, retrieves the audio cue assigned to the virtual arc point 52-60 from a storage device (e.g., memory 16 or database 30) and plays it via speakers 26. Afterwards, at step 124, processor 12 determines if the user has actuated the "select" button on pointing device 40. If not, processor 12 returns to step 118 and continues to track the movement of pointing device 40 along virtual arc 50. If so, processor 12, at step 126, provides audio feedback (e.g., an electronic beep or tone) to the user and, at step 128, determines if the user is currently at the lowest level of the multi-level tree data structure (e.g., level 80 of FIG. 3).

If the user is not at the lowest level, processor 12, at step 130, maps the current level of audio cues (e.g., level 74, 76 or 78 of FIG. 3) to points 52-60 of virtual arc 50 and returns to step 118 to track the movement of pointing device 40 along virtual arc 50. If the user is at the lowest level of the tree data structure, processor 12, at step 132, retrieves the audio data segment (e.g., song or song list) associated with the audio cues from a source of audio data segments (e.g., Internet 34, CD-ROM unit 28, database 30 and/or memory 16) and plays the segment via speakers 26.

Figure 7:
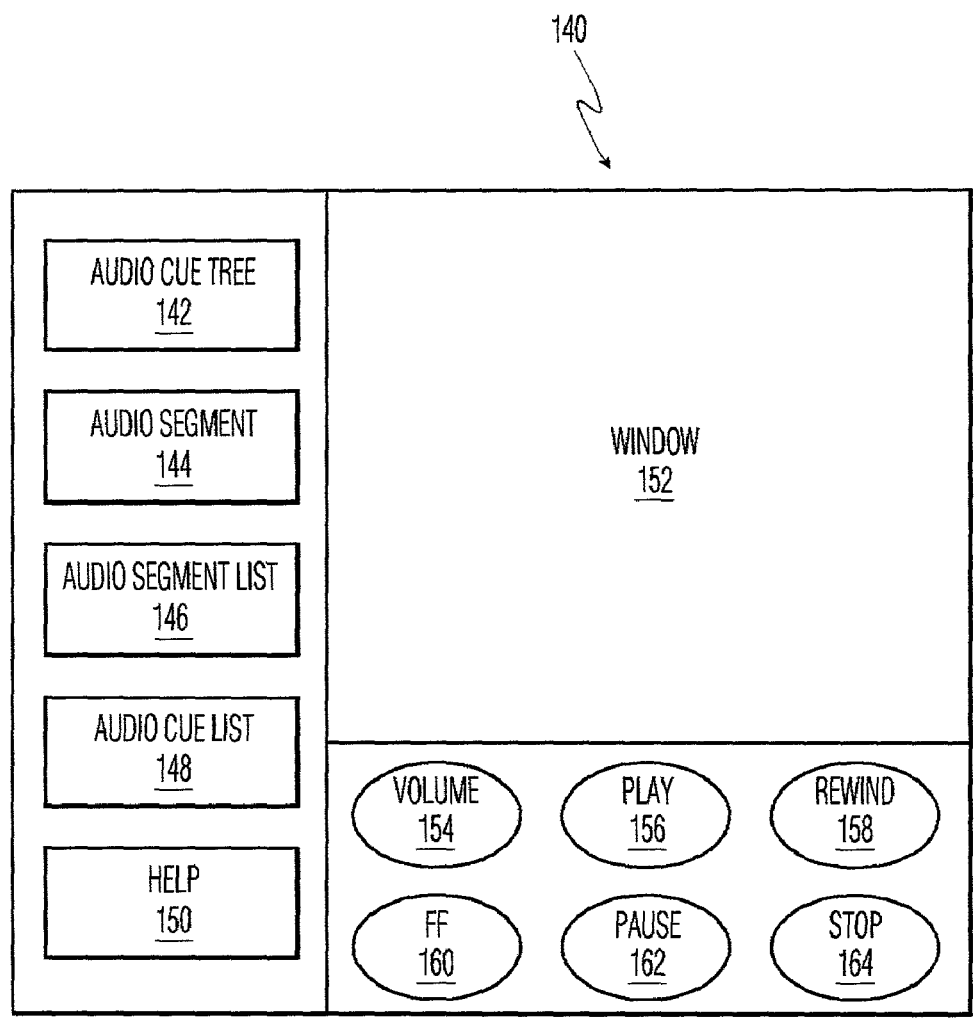
FIG. 7 is an exemplary graphical user interface for managing the acoustical interface of the present invention.

Referring now to FIG. 7, an exemplary graphical user interface ("GUI") 140 for managing the acoustical interface of the present invention is shown. GUI 140 includes an "Audio Cue Tree" pull-down menu 142, an "Audio Segment" pull-down menu 144, an "Audio Segment List" pull-down menu 146, an "Audio Cue List" pull-down menu 148 and a "Help" pull-down menu 150 for allowing a user to manipulate various audio cue trees, audio cues, and audio data segments, as discussed in further detail below. GUI 140 also includes a window section 152 that allows a user to view textual and/or graphical data (e.g., names, identifiers, file sizes) associated with selected audio information (e.g., audio cue trees, audio cues, audio data segments), as discussed in further detail below. GUI 140 further includes controls 154-164 facilitating the user's control of selected audio cues or audio data segments. Some exemplary controls include, but are not limited to, a "volume" icon 154, a "play" icon 156, a "rewind" icon 158, a "fast forward" icon 160, a "pause" icon 162, and a "stop" icon 164.

In operation, the user may run the acoustical interface software associated with GUI 140 on system 12. The software may be stored on any computer readable medium such as, but not limited to, a floppy disk, smart card, CD, or DVD, or may be downloaded from a remote server via an intranet (not shown) or internet 34. The user preferably views GUI on display 22 and manipulates the GUI pull-down-menus and icons using keyboard 24, a mouse (not shown), pointing device 40, or a similar hardware device.

If the user selects "Audio Cue Tree" pull-down menu 142, the following GUI icons, inter alia, are presented to the user. A "View Tree List" icon that, when selected, causes processor 12 to display a list of existing audio cues trees in window section 152. A "Create Tree" icon that, when selected, causes processor to display an input screen in window section 152 wherein the user can input an audio tree name, the number of levels in the audio tree, the number of cues per level, and other relevant data. A "Download Tree" icon that, when selected, causes processor 12 to download a pre-existing audio cues tree provided by the supplier of audio content (e.g., a pre-existing audio cue tree of audio cues that are representative of satellite radio stations and are provided by the satellite service provider). A "Select Tree" icon that, when selected, causes processor 12 to point to the memory location of the selected audio cue tree such that the user navigates through the selected audio tree the next time the acoustical interface is used. A "Link Tree" icon that, when selected, causes processor 12 to link selected levels of selected audio cue trees together such that the user can quickly create larger audio cue trees and/or create multiple pathways to a segment of audio information.

If the user selects "Audio Segment" pull-down-menu 144, the following GUI icons, inter alia, are presented to the user. A "Create Audio Segment" icon that, when selected, causes processor 12 to tag an audio data segment (e.g., a song in a stored MP3 file or on a compact disk track) in a storage device (e.g., CD-ROM unit 28, database 30, remote server connected to Internet 34) such that processor 12 can quickly retrieve the audio segment when the user selects the audio segment using the acoustical interface of the present invention. A "Play Audio Segment" icon that, when selected, causes processor to retrieve a selected audio data segment from a storage device and play it via speakers 26. (It should be noted that the user can control the playback of the selected audio data segment via control icons 154-164). A "Delete Audio Segment" icon that, when selected, causes processor 12 to erase an existing tag for a selected audio data segment.

If the user selects "Audio Segment List" pull-down menu 146, the following GUI icons, inter alia, are presented to the user. A "View Audio Segment List" icon that, when selected, causes processor 12 to display audio data segment lists in window section 152. (It should be noted that the displayed audio data segment lists, or audio data segments within a selected audio data segment list, may be sorted by artist name, album title, song title, source (e.g., CD-ROM unit 28, Database 30, Internet 34, etc.) or the like). A "Create Audio Segment List" icon that, when selected, causes processor 12 to display an input screen in window section 152 wherein the user can input, inter alia, an audio data segment list name and input the names of the audio data segments to be included in the created audio data segment list. An "Audio Segment Source" icon that, when selected, causes processor to display in window section 140 a list of available audio data segment sources (e.g., CD-ROM unit 28, Database 30, Internet 34, Memory 16, etc.) to which the user can add or remove audio data segment sources.

If the user selects "Audio Cue List" pull-down-menu 148, the following GUI icons, inter alia, are presented to the user. A "Create Audio Cue" icon that, when selected, causes processor 12 to display an input screen in window section 152 wherein the user can input the name of the audio cue and the source of the audio cue (i.e., a snippet of an audio segment, a microphone input, a computer-generated sound, or the like). A "Store Audio Cue" icon that, when selected, causes processor 12 to store a created audio cue in a storage device such as memory 16, local database 30, or a remote database via Internet 34. A "Play Audio Cue" icon that, when selected, causes processor to retrieve a selected audio cue from the storage device and play it via speakers 26. (It should be noted that the user can control the playback of the selected audio cue via control icons 154-164). A "Delete Audio Cue" icon that, when selected, causes processor 12 to erase the selected audio cue from the storage device. A "View Audio Cue List" icon that, when selected, causes processor 12 to list in window section 152 a list of existing audio cues linked audio segments. A "Link Audio Cue" icon that, when selected, causes processor 12 to display an input screen in window section 152 such that a user can enter the audio segment, audio cue tree, and audio cue tree level to which the selected audio cue is to be linked. An "Unlink Audio Cue" Icon that, when selected, causes processor 12 display an input screen in window section 152 such that a user can enter the audio segment, audio cue tree, and/or audio cue tree level from which the linked audio cue is to be deleted.

If the user selects "Help" pull-down menu 150, a plurality of "How To" icons are displayed to the user to enable the user to efficiently utilize GUI 140 of the acoustic interface of the present invention. It should be noted that alternative GUI displays, pull-down menus, icons, and controls for enabling the management of the audio, textual, and graphical data, as know by those skilled in the art, are considered within the scope of the present invention. For example, there may also be a "Data Segment" pull down menu in GUI 140 that facilitates a user's ability to link audio cues and/or audio cue trees to data segments other than audio data segments (e.g., linking audio cues or audio cue trees to text files, video files, and device functions).

Figure 8:
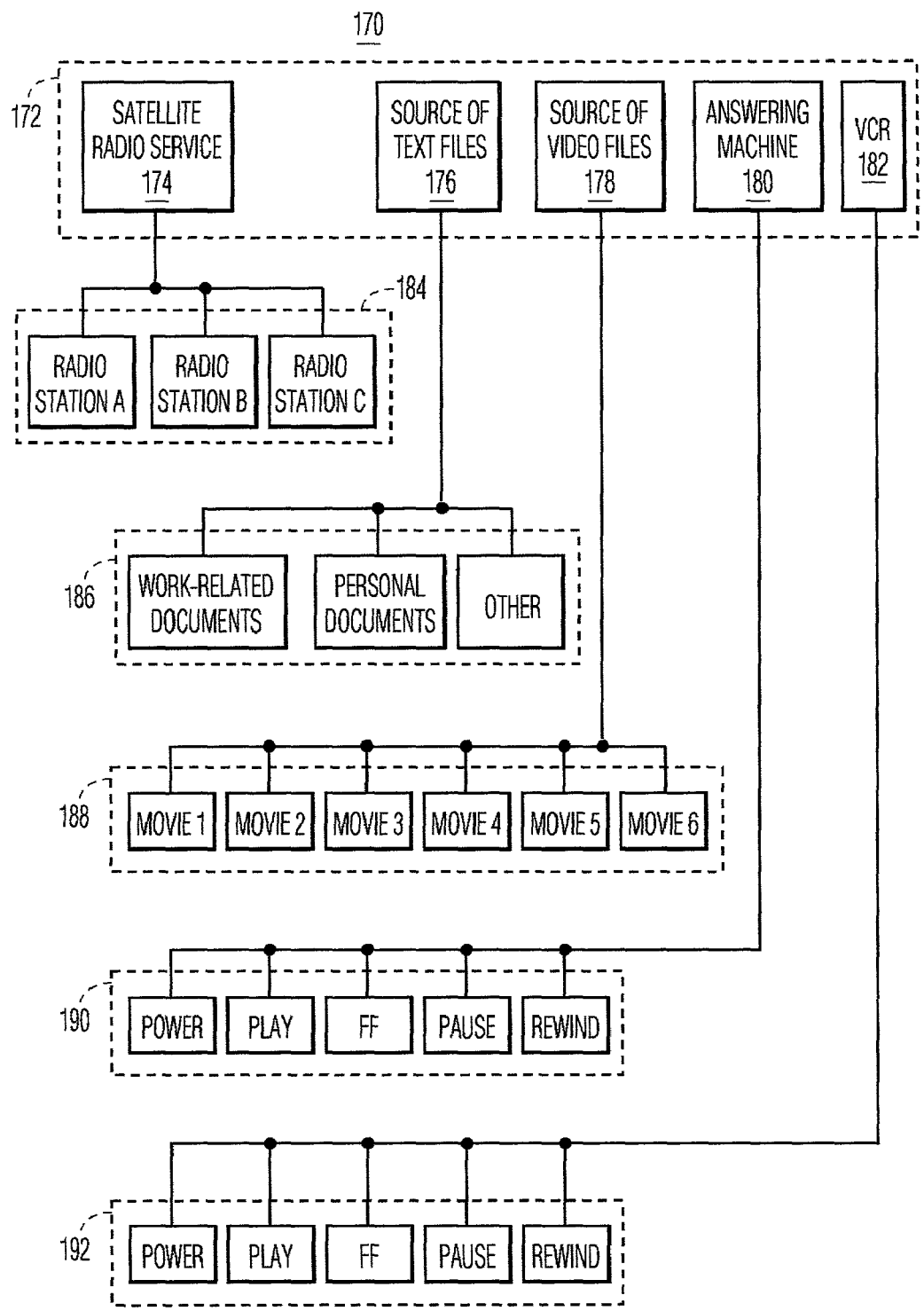
FIG. 8 is a further exemplary multi-level tree data structure for the audio cues of the acoustic interface of the present invention.

Turning to FIG. 8, another exemplary multi-level audio cue tree 170 is shown. Multi-level audio cue tree 170 illustrates that different levels 172 and 184-192 in audio cue tree 170 may have a different number of audio cues contained therein. Audio cue tree 170 also illustrates that audio cues may be linked to data segments that are not purely audio data segments. For example, level 176 contain an audio cue 176 that is representative of a source of text files, an audio cue 178 that is representative of a source of video files, an audio cue 180 that is representative of the controls of an answering machine, and an audio cue 182 that is representative of the controls of a VCR. Furthermore, level 186 contains additional audio cues that are representative of text files, level 188 contains audio cues (e.g., famous movie lines) that are representative of movies provided by the source of video files, and levels 190 and 192 contain cues that represent the individual controls of an answering machine an a VCR, respectively.

Level 172 also contains an audio cue 174 that is representative of a satellite radio service provider. The satellite service provider can potentially provide hundreds of radio stations to a user. As a result, the satellite service provider may also provide metadata about the stations to the user such that the user could use the metadata to generate audio cue trees. Alternatively, the service provider may provide downloadable audio cues and/or audio cue trees that the user can access. It should be noted that the bottom level 184 in an audio cue tree that is representative of a satellite radio station would not be a particular song or song list, but rather a pointer to a stream of audio content that will be arriving in the future. It should also be noted that Internet, DSL, cable, and other service providers may provide similar services and the use of these services to provide audio cues, audio cue trees, or data that facilitates the generation of audio cues or audio cue trees is considered within the scope of the invention.

While the present invention has been described with reference to the preferred embodiments, it is apparent that various changes may be made in the embodiments without departing from the spirit and the scope of the invention, as defined by the appended claims.

What is claimed is:

1. A method of providing access to a plurality of music files, the method comprising the steps of:

storing a plurality of audio cues arranged in a tree structure in a memory, each audio cue being selected by a user to represent a music file or a predetermined number of stored audio cues in the tree structure representing a music category; and permitting a user to navigate through the tree structure by playing audio cues in response to user requests such that the user is provided access to a first predetermined number of stored audio cues in the tree structure, permitted to play one of the first predetermined number of stored audio cues in response to a first user request, and permitted to retrieve one of a music file associated with the played audio cue or a second predetermined number of stored audio cues in the tree structure representing a music category in response to a second user request.

2. The method of claim 1, wherein the step of storing the plurality of audio cues further includes the step of:
creating the plurality of audio cues, prior to storage thereof, by sampling an audio data segment, recording a user voice, or recording a computer-generated voice.

3. The method of claim 1, wherein the step of storing the plurality of audio cues further includes the step of:
downloading a plurality of pre-existing audio cues.

4. The method of claim 1, wherein the step of permitting the user to navigate through the tree structure includes the step of:
mapping the first predetermined number of audio cues onto a plurality of points on a virtual configuration.

5. The method of claim 4, wherein the step of permitting the user to navigate through the tree structure includes the step of:
tracking the user's navigation along the virtual configuration such that only an audio cue is played when user has navigated within a predetermined distance from a point on the virtual configuration, the point being associated with the played audio cue.

6. The method of claim 1, wherein the method is embedded in one of a computer system, a stereo system, a home entertainment center, an automobile music system, or an electronic device.

7. A system for providing access to a plurality of music files, the system comprising:
means for storing a plurality of audio cues arranged in a tree structure in a memory, each audio cue being selected by a user to represent a music file or a predetermined number of stored audio cues in the tree structure representing a music category; and
means for permitting a user to navigate through the tree structure by playing audio cues in response to user requests such that the user is provided access to a first predetermined number of stored audio cues in the tree structure, permitted to play one of the first predetermined number of stored audio cues in response to a first user request, and permitted to retrieve one of a music file associated with the played audio cue or a second predetermined number of stored audio cues in the tree structure representing a music category in response to a second user request.

8. The system of claim 7, wherein the means for storing the plurality of audio cues further comprises:
means for creating the plurality of audio cues, prior to storage thereof, by sampling an audio data segment, recording a user voice, or recording a computer-generated voice.

9. The system of claim 7, wherein the means for storing the plurality of audio cues further comprises:
means for downloading a plurality of pre-existing audio cues.

10. The system of claim 7, wherein the means for permitting the user to navigate comprises:
means for mapping the first predetermined number of stored audio cues onto a plurality of points on a virtual configuration.

11. The system of claim 10, wherein means for permitting the user to navigate comprises:
means for tracking a user's navigation along the virtual configuration such that only an audio cue is played when user has navigated within a predetermined distance from a point on the virtual configuration, the point being associated with the played audio cue.

12. The system of claim 7, wherein the system is integrated with one of a computer system, a stereo system, a home entertainment center, an automobile music system, or an electronic device.

13. A user interface system, comprising:
a music file interface communicatively connected to a source of music files;
a computer readable medium interface communicatively connected to a computer readable medium having a plurality of audio cues stored thereon in a tree structure, each audio cue being selected by a user to represent a music file or a predetermined number of audio cues in the tree structure representing a music category;
a user input interface for receiving user requests;
an audio interface communicatively connected to an audio system;
a processor communicatively connected to the music file interface, computer readable medium interface, user input interface and audio interface, the processor permitting a user to navigate through the tree structure by playing audio cues via the audio interface in response to user requests received from the user input interface such that the user is provided access to a first predetermined number of stored audio cues in the tree structure via the computer readable medium interface, permitted to play one of the first predetermined number of stored audio cues via the audio interface in response to a first user request received from the user input interface, and permitted to retrieve one of a music file associated with the played audio cue via the music file interface or a second predetermined number of stored audio cues in the tree structure representing a music category via the computer readable medium interface in response to a second user request received from the user input interface.

14. The system of claim 13, wherein the computer readable medium is one of a local memory device, a remote memory device, or a removable memory device.

15. The system of claim 13, wherein at least one of the audio cues is created by the user prior to the storage on the computer readable medium.

16. The system of claim 13, wherein at least one of the audio cues is created by a provider of a music file.

17. The system of claim 13, wherein at least one of the audio cues and a music file reside on the same computer readable medium.

18. The system of claim 13, wherein the system is integrated with one of a computer system, a stereo system, a home entertainment center, an automobile music system, or an electronic device.

* * * * *